Aug. 8, 1933.    F. P. LAWLER    1,920,994
TORQUE DISTRIBUTOR
Filed April 4, 1932
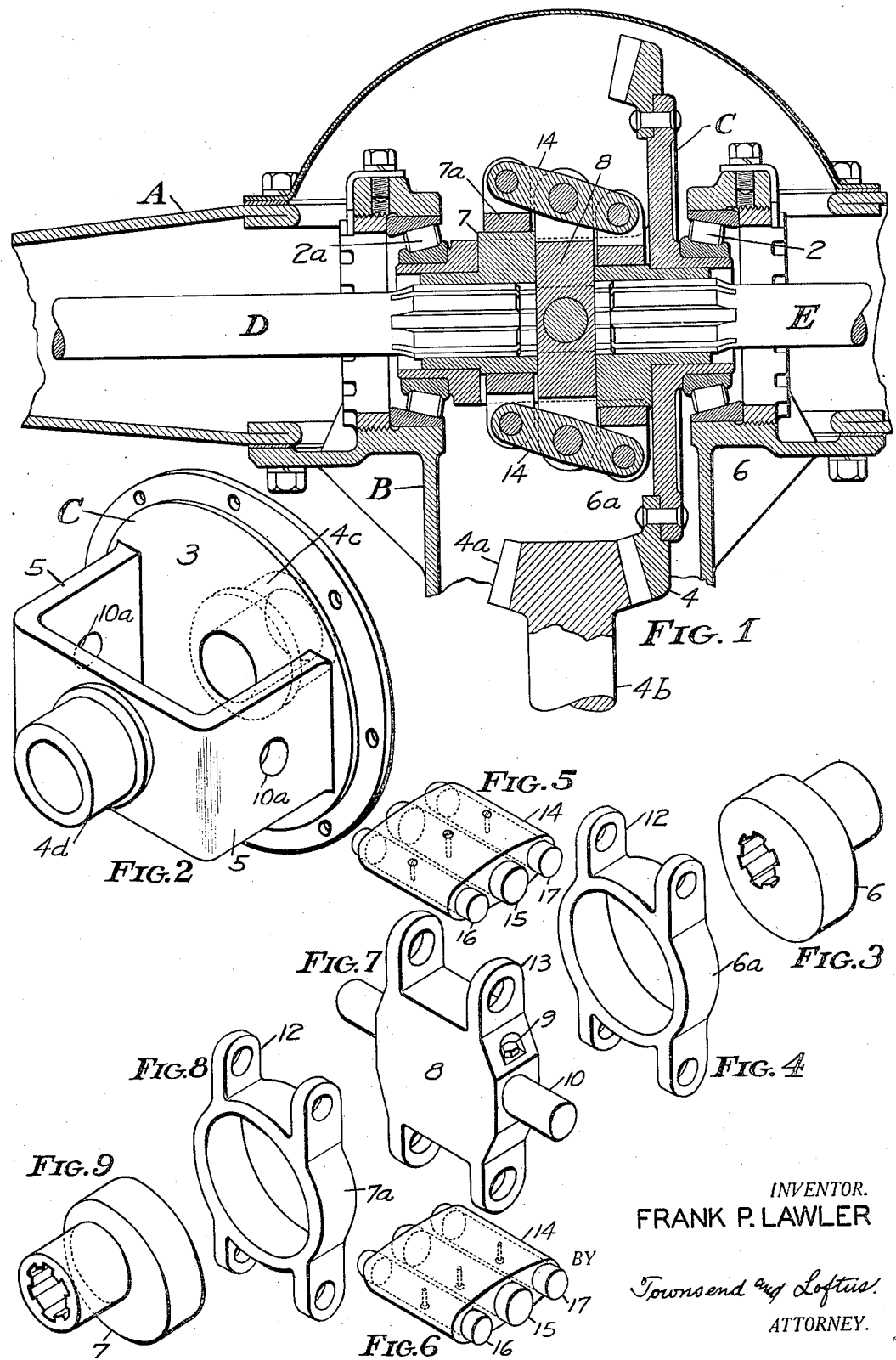
INVENTOR.
FRANK P. LAWLER
BY
Townsend and Loftus
ATTORNEY.

Patented Aug. 8, 1933

1,920,994

UNITED STATES PATENT OFFICE 1,920,994

TORQUE DISTRIBUTOR

Frank P. Lawler, San Francisco, Calif.

Application April 4, 1932. Serial No. 602,963

5 Claims. (Cl. 74—7)

This invention relates to torque distributors commonly referred to as differentials, and especially to a gearless type of torque distributor.

The object of the present invention is to generally improve and simplify the construction and operation of torque distributors; to provide a torque distributor in which gears are entirely eliminated; to provide a torque distributor in which the application of driving torque to the drive shaft will always cause both driven axles or wheels to positively rotate at the same speed regardless of the relative tractive ability of the wheels or the relative torque resistance of the axles, at the same time providing a relative rotational freedom of the driven wheels or axles in such a manner that they can rotate at different speeds only when the torque resistances of the axles or the tractive resistances of the wheels are encountered at different rates of speed, due to the influence of a steering mechanism as when rounding a turn, or by being forced to travel in a given time over uneven ground, or any condition where distance traveled over the two wheel resistance tracks is different; and further, to provide a torque distributor in which the torque delivered to the driven axles or wheels is always in direct proportion to their tractive ability or torque resistance and in which the power delivered to the driven axles or wheels is always in direct proportion to the product of their torque resistances and their travel speeds.

The torque distributor is shown by way of illustration in the accompanying drawing, in which—

Fig. 1 is a horizontal longitudinal section through the torque distributor and the housing enclosing the same.

Fig. 2 is a perspective view of the carrier.

Fig. 3 is a perspective view of one of the driven eccentrics.

Fig. 4 is a perspective view of one of the compensating rings.

Figs. 5 and 6 are perspective views of the rocker arms.

Fig. 7 is a perspective view of the driving plate.

Fig. 8 is a perspective view of one of the compensating rings.

Fig. 9 is a perspective view of one of the driven eccentrics.

Referring to the drawing in detail and particularly Fig. 1, A indicates a standard form of axle housing, and B a torque distributor or differential housing. Mounted within the housing are the usual bearings 2 and 2a, and supported to rotate in said bearings is a carrier generally indicated at C, see Figs. 1 and 2. The carrier consists of a circular plate 3 on the peripheral edge of which is secured a driving gear 4, which is adapted to be driven in the usual manner through a bevel gear pinion 4a secured on the propeller shaft 4b. The circular plate 3 of the carrier is provided with a hub 4c supported by the bearing member 2, and the plate is otherwise provided with a fork-shaped bracket 5 on which is formed a bearing hub 4d adapted to be supported by the bearing 2a. Journaled in each hub member is an eccentric, one being indicated at 6 and the other at 7, and surrounding each eccentric is a compensating ring, one being indicated at 6a and the other at 7a. Disposed between the eccentrics and the surrounding compensating rings is a driving plate, generally indicated at 8, see Figs. 1 and 7. This plate is secured by means of a set screw 9, or the like, to a shaft 10, and this is supported by the fork-shaped bracket 5 and extends through openings 10a formed therein; the shaft 10, together with the driving plate 8, being mounted for transverse reciprocal movement with relation to the fork-shaped bracket, or in other words the carrier C. The eccentrics 6 and 7 are provided with hubs, as shown, and they are splined to receive the inner end of a pair of driven axles D and E, the driven axles being secured to the rear driving wheels of an automobile or like vehicle through means of a semi-floating, a three-quarter floating, a full floating driving connection, or in any other manner desired.

A positive driving connection is formed between the carrier and the driving plate 8 through means of the cross shaft 10 so that the driving plate will always rotate in unison with the carrier. A positive driving connection is also formed between the driving plate and the compensating rings 6a and 7a so that these will rotate in unison with the driving plate, and this is accomplished as follows: Each compensating ring is provided with upper and lower spaced lugs generally indicated at 12. The driving plate is similarly provided with upper and lower spaced lugs 13, and a pair of rocker arms 14 are pivotally mounted between the lugs 13 through means of pins 15. Pins 16 and 17 are passed through the outer ends of the rocker arms and the lugs 12, and a positive driving connection is thus formed between the driving plate and the compensating rings but said driving connection permits only a constantly opposed movement of the two compensating rings relative to one another and to the driving plate in a plane substantially at right angles to the transverse movement of the driving plate.

The main distinguishing feature in the torque distributor forming the subject matter of this application, when compared with a standard form of differential, is that the driving torque is always transmitted to the wheels or axles in direct proportion to their torque resistances, while in the standard form of differential the driving torque tends to dissipate itself in the wheel or axle having the least resistance. To further bring out the importance of the present torque distributor, it may be stated that it is impossible to spin one wheel without the other wheel turning in unison therewith and, consequently, the tractive ability of both wheels is constantly available for driving and acceleration. This in contra-distinction to the ordinary differential which is always free to spin the wheel affording the least resistance without transmitting any rotation to the other wheel.

The reason power is transmitted to the wheels in proportion to the product of their tractive resistance and their speeds and torque in proportion to their tractive resistances is due to the following: First of all, it must be remembered that the carrier is positively driven through gear 4 at all times and so is the driving plate 8, the compensating rings 6a and 7a and the eccentrics driven thereby. Plainly speaking, there is a positive drive to each eccentric but the eccentrics may rotate at different speeds and when rotating at different speeds the power transmitted to each eccentric will be in proportion to their speeds times their torque resistance. For instance, if when rounding a curve on a surface assumed to offer equal tractive resistance to both wheels, shaft D and its eccentric 7 is rotating five R.P.M., and shaft E and its eccentric is rotating ten R.P.M., the carrier, together with the driving plate and the compensating rings, will rotate seven and one-half R.P.M., or in other words at the average speed of the two driven shafts. Due to this difference in speed an oscillating movement is transmitted to the compensating rings in addition to their rotating movement, and it is due to the oscillating movement that power is transferred from one compensating ring to the other through the rocker arms 14, from the eccentric rotating at the slower speed to the eccentric rotating at the higher speed, resulting in power being delivered to the respective axles or wheels in direct proportions to their speeds. The turning torque delivered to each axle in this case is the same because it has been assumed that equal traction is afforded both wheels but the rate of power delivery is in proportion to the speed of the respective axles, as the eccentric rotating at the higher speed is receiving part of its power from the eccentric rotating at the slower speed, hence power is transmitted to the eccentric and the axle rotating at the higher speed not only due to the rotation of the torque transmitting mechanism as a whole but also due to the oscillating movement transmitted from one compensating ring to the other. For this reason it may be stated the rings 6a and 7a function not only as compensating rings but also driving rings.

If both wheels are rotating at the same speed, as when traveling over a straight roadway, both shafts, both eccentrics and both compensating rings, together with the driving plate and carrier, will rotate as a unit. The rocker arms will not oscillate under these conditions, nor will the driving plate move transversely of the carrier. Furthermore, the turning torque or power transmitted to each shaft will be equal provided that their tractive resistance is equal. If the tractive resistance of one wheel is reduced as by entering a mud hole both wheels will rotate at the same speed but the maximum power or turning torque will be transmitted to the other wheel due to the fact that there is a positive lock between the eccentrics, the compensating rings, the driving plate and the carrier at all times when there is no change in speed between the wheels or axles. In fact, there can be no change in speed between the wheels or axles, except under one condition and that is when both wheels have traction and one wheel is required to travel a greater distance than the other as when rounding a curve, or when one wheel is traveling over a flat surface and the other wheel over an undulating surface, hence there is a positive lock between the driven axles and the torque transmission mechanism at all times, except under the condition specified, and when that one condition is encountered the torque transmitted will be in proportion to the product of the tractive resistances and their speed.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A torque distributor comprising a driving shaft and a carrier driven thereby, a pair of driven axles, an eccentric secured on each axle, a compensating ring surrounding each eccentric and in which the eccentrics are rotatable, a driving plate driven by the carrier and movable transversely of the carrier only, and a positive driving connection between the driving plate and the compensating rings.

2. A torque transmitter comprising a driven carrier, a driving plate driven by the carrier and mounted for reciprocal movement transverse of the carrier, a pair of driven axles, one on each side of the carrier, a pair of eccentrics secured one to each axle, a compensating ring surrounding each eccentric in which the eccentrics are rotatable, a pair of opposed rocker arms centrally pivoted on the driving plate, pivotal connections between one end of the rocker arms and one compensating ring, and pivotal connections between the opposite ends of the rocker arms and the other compensating ring.

3. A torque distributor comprising a driving shaft and a carrier driven thereby, a pair of aligned axles and an eccentric secured on each axle, a compensating ring surrounding each eccentric and in which the eccentrics are rotatable, a driving plate mounted in the carrier and disposed between the eccentrics and the compensating rings, and a driving connection between the driving plate and the compensating rings, said driving connections comprising a pair of rocker arms centrally pivoted on the driving plate, said rocker arms being pivotally connected at their outer ends to opposite sides of the compensating rings whereby the compensating rings are limited to a reciprocal movement in one plane only.

4. A torque distributor comprising a driving shaft and a carrier driven thereby, a pair of aligned axles, an eccentric secured on each axle, a compensating ring surrounding each eccentric and in which the eccentrics are rotatable, a driving plate mounted in the carrier and only movable transversely of the carrier at right angles to the aligned axles, and a driving connection between the driving plate and the respective compensating rings whereby the compensating rings are limited to a reciprocal movement only at right angles to the transverse movement of the driving plate.

5. A torque distributor comprising a driving shaft and a carrier driven thereby, a pair of aligned axles, an eccentric secured on each axle, a compensating ring surrounding each eccentric and in which the eccentrics are rotatable, a driving plate mounted in the carrier and only movable transversely of the carrier at right angles to the aligned axles, a pair of rocker arms carried by the driving plate, one on each side thereof, pivotal connections between the outer ends of the rocker arms and the respective compensating rings, and a central pivotal connection between each arm and the driving plate, said rocker arms causing a reciprocal movement only of the compensating rings in a direction at right angles to the transverse movement of the driving plate.

FRANK P. LAWLER.